(12) United States Patent
Polishchuk et al.

(10) Patent No.: US 9,441,937 B2
(45) Date of Patent: Sep. 13, 2016

(54) METHOD AND APPARATUS FOR MEASURING THICKNESS OF AN OBJECT

(71) Applicant: General Electric Company, Schenectady, NY (US)

(72) Inventors: Yakov Polishchuk, Niskayuna, NY (US); Robert William Tait, Niskayuna, NY (US); William Judson Hendrix, Jr., Laurens, SC (US); Michael Francis Strong, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 104 days.

(21) Appl. No.: 14/568,912

(22) Filed: Dec. 12, 2014

(65) Prior Publication Data

US 2015/0096184 A1    Apr. 9, 2015

Related U.S. Application Data

(63) Continuation-in-part of application No. 13/731,929, filed on Dec. 31, 2012, now Pat. No. 8,919,004.

(60) Provisional application No. 61/715,906, filed on Oct. 19, 2012.

(51) Int. Cl.
*G01B 5/06* (2006.01)
*G01B 21/08* (2006.01)
(Continued)

(52) U.S. Cl.
CPC . *G01B 5/06* (2013.01); *G01B 3/50* (2013.01); *G01B 21/08* (2013.01); *G01B 21/16* (2013.01); *G01B 2210/58* (2013.01)

(58) Field of Classification Search
CPC .................................. G01B 5/06; G01B 7/06

USPC .......... 33/701, 783, 784, 832, 833, 834, 836
See application file for complete search history.

(56) References Cited

U.S. PATENT DOCUMENTS

| 4,213,319 A * | 7/1980 | Gold ...................... B21D 28/06 |
| | | 33/783 |
| 5,036,901 A | 8/1991 | Williams et al. |

(Continued)

FOREIGN PATENT DOCUMENTS

| CN | 201173754 Y | 12/2008 |
| CN | 202372136 U | 8/2012 |

(Continued)

OTHER PUBLICATIONS

Ping et al., "Design and implementation of the high precision laser thickness gauge", Proceedings of the 32nd Chinese Control Conference (CCC), Jul. 26-28, 2013, pp. 8387-8390.

(Continued)

*Primary Examiner* — G. Bradley Bennett
(74) *Attorney, Agent, or Firm* — Robert M. McCarthy

(57) ABSTRACT

An apparatus for measuring thickness of an object is provided. The apparatus includes a compression control system which further includes a movable platform, a compression sensor, and a switching device operatively coupled to the compression sensor. The apparatus also includes a measurement system operatively coupled to the switching device for receiving a signal representative of a toggle event at the switching device and configured to measure a gradient. The apparatus also includes a processing circuit operatively coupled to the switching device and the measurement system for measuring a thickness of the object upon receiving the signal representative of the toggle event at the switching device by using the gradient and a communication circuit for transmitting a measured thickness of the object to a remote database.

18 Claims, 2 Drawing Sheets

(51) Int. Cl.
*G01B 21/16* (2006.01)
*G01B 3/50* (2006.01)

(56) References Cited

U.S. PATENT DOCUMENTS

| | | | |
|---|---|---|---|
| 5,146,416 A * | 9/1992 | Kuo | G01B 5/06 |
| | | | 700/303 |
| 6,308,754 B1 * | 10/2001 | Chang | B23Q 17/20 |
| | | | 144/117.1 |
| 6,502,057 B1 | 12/2002 | Suzuki | |
| 6,553,638 B1 | 4/2003 | Kohlstrand et al. | |
| 6,553,685 B2 | 4/2003 | Nishina et al. | |
| 7,637,025 B2 * | 12/2009 | Lee | G01B 5/061 |
| | | | 33/507 |
| 8,919,004 B2 * | 12/2014 | Wu | G01B 21/08 |
| | | | 33/501.45 |
| 2006/0090363 A1 * | 5/2006 | Luner | G01B 3/28 |
| | | | 33/833 |
| 2006/0191154 A1 * | 8/2006 | Kraemer | G01B 5/061 |
| | | | 33/832 |
| 2009/0157349 A1 * | 6/2009 | Walker | G01B 7/06 |
| | | | 702/170 |
| 2012/0149281 A1 * | 6/2012 | Wan | G01B 11/026 |
| | | | 451/5 |
| 2013/0185950 A1 | 7/2013 | Oode et al. | |
| 2014/0109418 A1 | 4/2014 | Wu et al. | |
| 2014/0150570 A1 | 6/2014 | Nahum et al. | |
| 2015/0027240 A1 * | 1/2015 | Jeong | G01B 21/08 |
| | | | 73/863 |
| 2015/0048843 A1 * | 2/2015 | Hinken | G01B 7/06 |
| | | | 324/635 |
| 2016/0076871 A1 * | 3/2016 | Volz | G01B 7/105 |
| | | | 324/227 |
| 2016/0123712 A1 * | 5/2016 | Cook | G06F 3/14 |
| | | | 33/819 |

FOREIGN PATENT DOCUMENTS

| | | |
|---|---|---|
| CN | 103730387 A | 4/2014 |
| CN | 203964893 U | 11/2014 |
| DE | 10339778 A1 | 3/2005 |
| JP | 0458101 A | 2/1992 |
| JP | 8327347 A | 12/1996 |
| WO | 2008012535 A2 | 1/2008 |

OTHER PUBLICATIONS

Ohta, T. et al., "Adaptive control for the head-end strip gauge using recursive least squares at hot strip mill", Proceedings of the 2006 IEEE International Conference on Control Applications, Oct. 4-6, 2006 pp. 1831-1836.

"Wireless Electronic Feeler Gauge from Capacitec", Sensors, Apr. 8, 2012, retrieved from http://www.sensorsmag.com/product/wireless-electronic-feeler-gauge-capacitec on May 12, 2016.

European Search Report and Opinion issued in connection with corresponding EP Application No. 15197958.0 on Apr. 20, 2016.

U.S. Appl. No. 13/731,929, filed Dec. 31, 2012, Juntao Wu.

\* cited by examiner

METHOD AND APPARATUS FOR MEASURING THICKNESS OF AN OBJECT

CROSS REFERENCE TO RELATED APPLICATIONS

This application is a Continuation-in-Part of U.S. patent application Ser. No. 13/731,929 filed on Dec. 31, 2012, which claims the benefit of Provisional Patent Application Ser. No. 61/715,906 filed Oct. 19, 2012, and the entire contents of both applications are incorporated herein by reference.

BACKGROUND

The disclosure generally relates to measuring apparatus and, more particularly, to a method and an apparatus for measuring thickness of an object.

Measuring apparatus are used to measure different dimensions of an object. One such measuring apparatus includes an apparatus for measuring thickness of an object. Various kinds of apparatuses are available for measuring thickness of different kinds of objects. Some of them may include a thickness gauge and a Vernier caliper. Different thickness measurement apparatuses employ different mechanisms for measuring the thickness of the objects. Once such mechanism includes placing an object between two surfaces of the thickness measurement apparatus and compressing a first surface against a second surface of the thickness measurement apparatus to measure the thickness of the object placed between the first surface and the second surface. In such apparatuses, one of the surfaces is fixed and the other surface is moved using an external force till the other surface comes in contact with the object.

The external force, which for example may include human effort, may vary based on a user who is performing the measurement. Due to the human interference in the measurement process, the measurement of the thickness of the object may vary, which leads to inconsistent measurements and undesirable errors. Furthermore, in conventional thickness measurement systems, the user is required to note the thickness measurement of each object manually. In scenarios, where thickness measurement of multiple objects is required to be performed within a predefined time, noting the thickness measurement manually for each object leads to human errors and loss of time.

Hence, there is a need for an improved thickness measurement system to address the aforementioned issues.

BRIEF DESCRIPTION

Briefly, in accordance with one embodiment, an apparatus for measuring thickness of an object is provided. The apparatus includes a compression control system which further includes a movable platform, a compression sensor, and a switching device operatively coupled to the compression sensor. The apparatus also includes a measurement system operatively coupled to the switching device for receiving a signal representative of a toggle event at the switching device and configured to measure a gradient. The apparatus also includes a processing circuit operatively coupled to the switching device and the measurement system for measuring a thickness of the object upon receiving the signal representative of the toggle event at the switching device by using the gradient and a communication circuit for transmitting a measured thickness of the object to a remote database.

In another embodiment, a thickness gauge is provided. The thickness gauge includes a compression control system which further includes a movable platform disposed within a lower surface of a cavity in the thickness gauge, where the movable platform comprises a toggle key, a spring system mechanically coupled to the movable platform, and a switching device situated below the toggle key at a predetermined distance. The thickness gauge also includes a measurement system operatively coupled to the switching device for receiving a signal representative of a toggle event at the switching device and configured to measure a gradient. The apparatus also includes a processing circuit operatively coupled to the switching device and the measurement system for measuring a thickness of the object upon receiving the signal representative of the toggle event at the switching device by using the gradient and a communication circuit for transmitting a measured thickness of the object to a remote database via a wireless medium.

In yet another embodiment, a method for measuring thickness of an object is provided. The method includes placing an object on a movable platform in a thickness measuring apparatus, compressing a plunger on to the object placed on the movable platform, toggling a switching device using a toggle key upon sensing a predetermined compression by a compression sensor, measuring a distance of movement of the plunger using the measurement device upon toggling the switching device, obtaining a thickness measurement of the object by using the distance measured upon toggling the switching device, and automatically transmitting the thickness measurement to a remote database via a wireless medium.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present disclosure include an apparatus and a method for measuring thickness of an object. The apparatus includes a compression control system which further includes a movable platform, a compression sensor, and a switching device operatively coupled to the compression sensor. The compression control system is used to toggle a switching device at a predefined compression of the movable platform. The apparatus also includes a measurement system which further includes a processing circuit operatively coupled to the switching device for measuring a thickness of the object upon a toggle event at the switching device and a communication circuit for transmitting a measured thickness of the object to a remote database.

Figure 1:
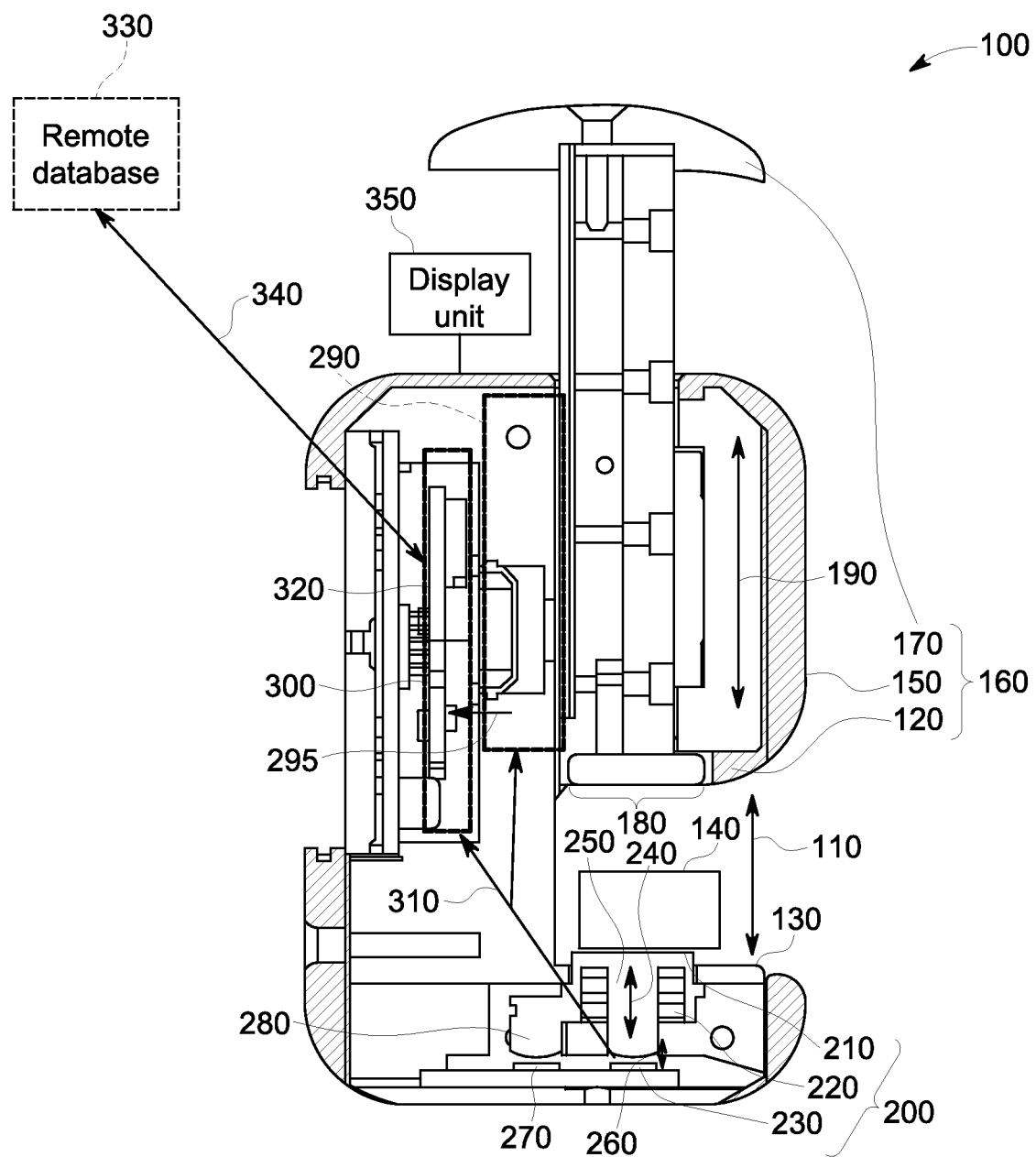
FIG. 1 is a sectional view of a thickness gauge in accordance with one embodiment.

FIG. 1 is a schematic representation of a sectional view of a thickness gauge 100 in accordance with one embodiment. The thickness gauge 100 includes a cavity 110 having an upper surface 120 and a lower surface 130. The cavity 110 is used to place an object 140 of which a thickness has to be measured. The thickness gauge 100 also includes a gauge housing 150 affixed around the cavity 110 which is used to hold various components of the thickness gauge 100. The thickness gauge 100 also includes a plunger assembly 160 within the gauge housing 150. The plunger assembly 160 includes a plunger 170, which moves in a direction represented by arrow 190 upon exertion of external force. The upper surface 120 also forms a part of the plunger assembly 160 and includes a plunger cavity 180, which enables the plunger 170 to move in direction 190. In the illustrated embodiment, the direction 190 is vertical.

The thickness gauge 100 also includes a compression control system 200 which includes a movable platform 210, a compression sensor 220, and a switching device 230. The movable platform 210 is disposed on the lower surface 130 of the cavity 110 and is configured to move in a direction represented by arrow 240 upon exertion of external force, which in this illustrated embodiment is vertical. The movable platform 210 may include a toggle key 250. The toggle key 250 may be defined as a projection extending downward from the movable platform 210 towards the switching device 230 and is positioned above the switching device 230 such that a predetermined distance 260 is maintained between the toggle key 250 and the switching device 230. In one embodiment, the movable platform 210 may include an anvil.

In one embodiment, the compression sensor 220 is operatively coupled to the movable platform 210 and the compression sensor 220 may be placed at any locations about the thickness gauge 100. In one embodiment, the compression sensor 220 may be located on the plunger assembly 160, on the plunger 170, or below the movable platform 210. In another embodiment, the compression sensor 220 may include a spring system, a pressure sensor, or a force sensor. The pressure sensor is configured to sense a pressure exerted on either the object 140 or the plunger 170. On the other hand, the force sensor is configured to sense a force exerted on the plunger 170. In one embodiment, the spring system is mechanically coupled to the movable platform 210. In a specific embodiment, the movable platform 210 may include a hollow cylindrical shape and the spring system may be disposed within the movable platform 210. In another embodiment, the movable platform 210 may include a solid cylindrical shape and the spring system may be disposed below the movable platform 210.

The compression control system 200 further includes the switching device 230 which is operatively coupled to the compression sensor 220. In one embodiment, where the compression sensor 220 includes the spring system, the switching device 230 may be situated below the toggle key 250 at the predetermined distance 260. In another embodiment, the compression control system 200 may further include an additional switching device 270 situated adjacent to the switching device 230. The additional switching device 270 is used to activate the thickness gauge 100. In order to activate the thickness gauge 100, the plunger 170 is depressed such that the plunger 170 exerts a force on the movable platform 210. Upon exertion of the force the movable platform moves in a direction, which further moves an additional toggle key 280 attached to the movable platform 210. The additional toggle key is also positioned above the additional switching device 270 at the predetermined distance 260. Such movement of the additional toggle key 280 enables the additional toggle key 280 to make physical contact with the additional switching device 270. The physical contact between the additional switching device 270 and the additional toggle key 280 is known as a toggle event which activates the thickness gauge 100 for performing measurements.

In order to measure the thickness of the object 140 using the thickness gauge, the object 140 is placed on the movable platform 210 at the lower surface 130 of the cavity 110 by a user or an automated mechanism (not shown). Upon placing the object 140 on the movable platform 210, in one example the user or any other person compresses the plunger 170 towards the object 140. Such compression of the plunger 170 enables the plunger 170 to make contact (touch) with the object 140 which further compresses the object 140 and the movable platform 210 in the downward direction 240.

In the embodiment, the movable platform 210 includes a hollow cylindrical shape and the compression sensor 220 includes the spring system (also referenced as 220), as noted above, the spring system 220 may be situated within the movable platform 210. Therefore, in continuation to the movement of the movable platform 210 in the downward direction 240, a force is exerted on the spring system 220 which further compresses the spring system 220. The spring system 220 is configured to sustain a predetermined compression after which the spring system 220 inhibits the downward movement of the movable platform 210. Therefore, a distance 260 between the switching device 230 and the toggle key 250 is provided during the designing of the thickness gauge 100 such that the toggle key 250 is able to toggle the switching device 230 upon reaching the predetermined compression of the spring system 220. The spring system 220 and the movable platform 210 with the toggle key 250 are installed in the thickness gauge 100 such that upon reaching the predetermined compression of the spring system 220, the toggle key 250 makes physical contact (touches) the switching device 230, which performs the toggle event of the switching device 230. As used herein, the toggle event may be defined as a control signal generated by the switching device 230 to determine measurement of a change in location (movement) of the plunger 170 using a measurement system 290 at the time instant, in which the toggle key 250 touches the switching device. Therefore, it is to be understood that upon achieving the predetermined compression of the spring system 220, the toggle key 250 performs a toggle event and the switching device 230 sends a signal to a measurement system 290 to take a measurement of the thickness of the object 140. For simplicity of understanding, the application of the thickness gauge 100 is discussed with respect to the embodiment including the spring system, however, other embodiments may also be operated in a similar manner to achieve the same result.

The thickness gauge 100 further includes the measurement system 290 which is operatively coupled to the switching device 230. In one example the measurement system receives a signal 310 representative of the toggle event of the switching device 230 based on which the measurement system 290 measures a gradient movement of the plunger 170 in the thickness gauge 100. As used herein, the term "gradient movement" may be defined as an increase or decrease in the magnitude of a property (distance being the property in this application) observed in passing from one point to another. In one embodiment, the measurement system 290 may include a magnetic strip that may be attached to the plunger 170. The magnetic strip in one example includes a predefined gradient which may be read using a magnetic sensor. The measurement system 290 also includes the magnetic sensor that may measure the movement of the magnetic strip to determine a distance 295 which the plunger 170 has moved. In other embodiments, the measurement system 290 may also include different kinds of known measurement systems that may be modified suitably to be used in the thickness gauge to measure the distance 295 travelled by the plunger 170.

The thickness gauge 100 further includes a processing circuit 300 which is operatively coupled to the switching device 230 and the measurement system 290. The switching device 230 transmits the signal 310 also to the processing circuit 300 to compute measurement of the thickness of the object 140 upon execution of the toggle event performed by the toggle key 250. The processing circuit 300 receives the signal 310 and computes the thickness of the object 140 placed in the cavity 110 by obtaining the distance 295 measured by the measurement system 290. The processing circuit 300 may include preinstalled data related to a default position of the plunger 170, distance between the default position of the plunger 170 and a default position of the movable platform 210, distance between the toggle key 250 and the switching device 230, and any other data which may be used to compute the thickness of the object 140. The processing circuit 300 uses the measured distance 295 and the preinstalled data for computing the thickness of the object 140. Upon computing the thickness of the object 140, a communication circuit 320 operatively coupled to the processing circuit 290 transmits a measured thickness of the object 140 to a remote database 330 via a wireless medium 340. In one embodiment, the wireless medium 340 may include a Bluetooth network, a Wi-Fi network, or a WiMAX network. In another embodiment, the thickness gauge 100 may further include a display unit 350 which may receive the thickness measurement simultaneously in addition to the remote database 330 from the communication circuit 320. In an exemplary embodiment, the communication circuit 320 may be located separately with the processing circuit 300 or may be integrated within the processing circuit 300.

Figure 2:
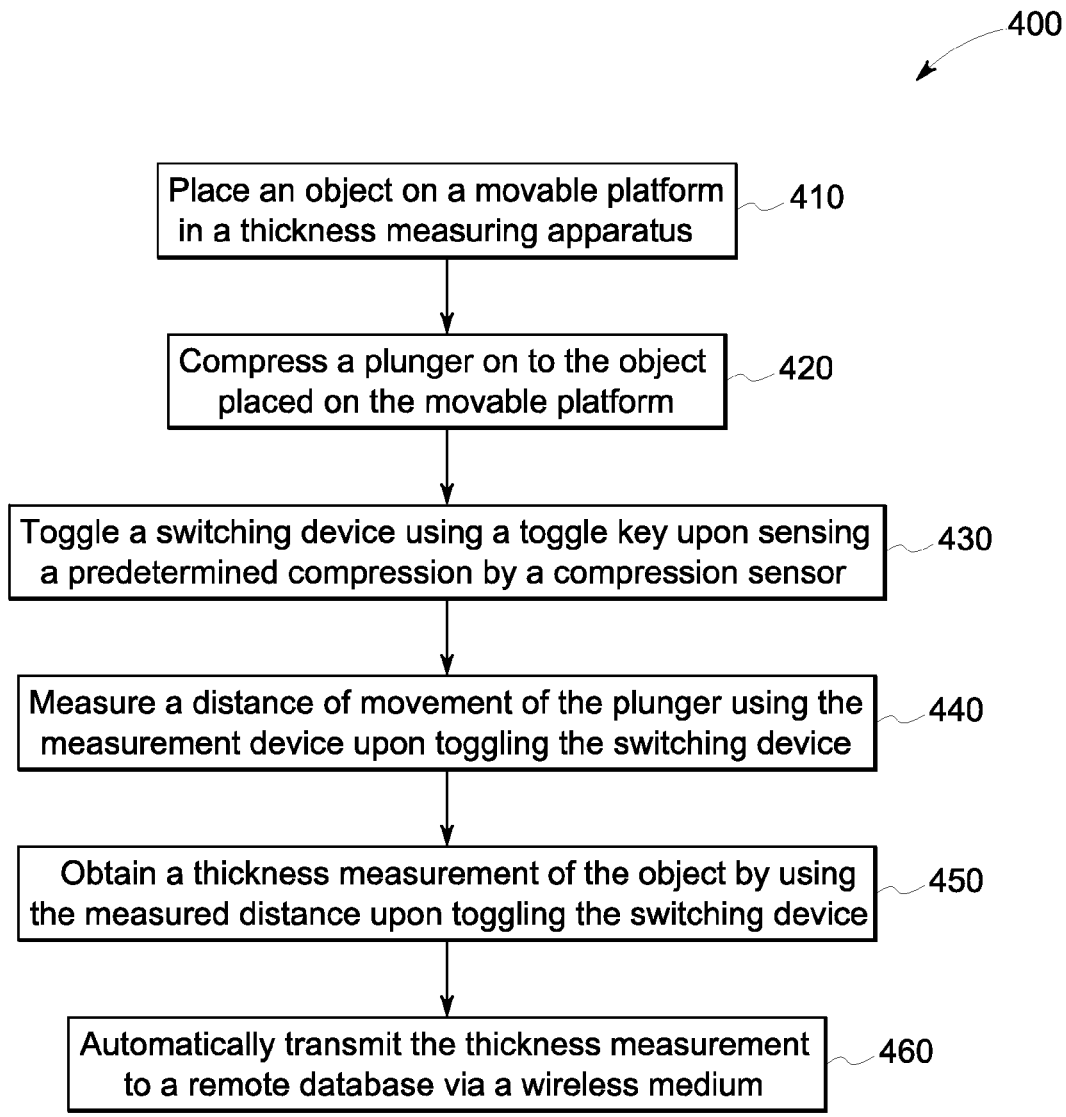
FIG. 2 is a flow chart representing the steps involved in a method for measuring thickness of an object in accordance with one embodiment.

FIG. 2 is a flow chart representing steps involved in a method 400 for measuring a thickness of an object in accordance with one embodiment. The method 400 includes placing an object on a movable platform in a thickness measuring apparatus in step 410. The method 400 also includes compressing a plunger on to the object placed on the movable platform in step 420. The method 400 further includes toggling a switching device using a toggle key upon sensing a predetermined compression by a compression sensor in step 430. The method 400 also includes measuring a distance of movement of the plunger using the measurement device upon toggling the switching device in step 440. The method 400 also includes obtaining a thickness measurement of the object by using the measured distance upon toggling the switching device in step 450. The method 400 further includes automatically transmitting the thickness measurement to a remote database via a wireless medium in step 460. In one embodiment, automatically transmitting the thickness measurement to the remote database via the wireless medium may include automatically transmitting the thickness measurement to the remote database via a Bluetooth network, a Wi-Fi network, or a WiMAX network.

One non-limiting example is the use of the thickness gauge 100 that is used to support a technician that measures gap clearances in a turbine engine such as the gap between a turbine blade and the shroud. In this example the technician uses a feeler gauge and inserts a number of the feeler gauge leaves into the gap. Upon extraction of the feeler gauge, the technician places the feeler gauge leaves from the gap onto the movable platform 210 of the thickness gauge 100 and engages the plunger 170 to automatically measure the gap thickness and communicate the measurement. In this manner, a more consistent measurement is achieved. In addition the automated reporting allows for the system to immediately note to the technician if the gap measurement represents an anomaly or out of range tolerance that requires further investigation. By comparing the measurement to historical data, a system may allow for trend analysis and prediction of remaining useful service life and maintenance.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

The exemplary embodiments of the apparatus for measuring a thickness of an object described hereinabove provide better gauge repeatability and reproducibility. The compression control system enables measurement of the thickness of the object with same magnitude of force which provides consistent repeatability and reproducibility. The exemplary apparatus also enables measurement of thickness and its transcription in a single step reducing transcription errors and loss of time. The transmission of the measurement via a wireless medium to a remote database helps in achieving the one step measurement and transcription of the thickness.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus for measuring thickness of an object, comprising:
   a compression control system comprising:
      a movable platform;
      a compression sensor;
      a switching device operatively coupled to the compression sensor;
   a measurement system operatively coupled to the switching device for receiving a signal representative of a toggle event at the switching device and configured to measure a gradient;
   a processing circuit operatively coupled to the switching device and the measurement system for measuring a thickness of the object upon receiving the signal representative of the toggle event at the switching device by using the gradient; and
   a communication circuit for transmitting a measured thickness of the object to a remote database via a wireless medium.

2. The apparatus of claim 1, wherein the compression sensor is operatively coupled to the movable platform.

3. The apparatus of claim 1, wherein the compression sensor comprises a spring system, a pressure sensor or a force sensor.

4. The apparatus of claim 3, wherein the spring system is mechanically coupled to the movable platform.

5. The apparatus of claim 1, wherein the movable platform comprises a toggle key to perform the toggle event.

6. The apparatus of claim 1, wherein the switching device is located below a toggle key at a predetermined distance.

7. The apparatus of claim 1, wherein the compression sensor is operatively coupled to a plunger assembly.

8. A thickness gauge comprising:
a compression control system comprising:
- a movable platform disposed within a lower surface of a cavity in the thickness gauge, wherein the movable platform comprises a toggle key;
- a spring system mechanically coupled to the movable platform;
- a switching device situated below the toggle key at a predetermined distance;

a measurement system operatively coupled to the switching device for receiving a signal representative of a toggle event at the switching device and configured to measure a gradient;

a processing circuit operatively coupled to the switching device and the measurement system for measuring a thickness of the object upon receiving the signal representative of the toggle event at the switching device by using the gradient; and a communication circuit for transmitting a measured thickness of the object to a remote database via a wireless medium.

9. The thickness gauge of claim 8, wherein the movable platform comprises a hollow cylindrical shape.

10. The thickness gauge of claim 9, wherein the spring system is situated within the movable platform.

11. The thickness gauge of claim 8, wherein the movable platform comprises a solid cylindrical shape.

12. The thickness gauge of claim 11, wherein the spring system is situated below the movable platform.

13. The thickness gauge of claim 8, further comprising a plunger assembly disposed above an upper surface of the cavity in a gauge housing.

14. The thickness gauge of claim 8, further comprising an additional switching device situated adjacent to the switching device for redundancy.

15. The thickness gauge of claim 8, wherein the wireless medium comprises a Bluetooth network, a Wi-Fi network, or a WiMAX network.

16. The thickness gauge of claim 8, further comprising a display unit operatively coupled to the thickness gauge, wherein the communication circuit transmits the thickness measurement of the object to the display unit in addition to the remote database.

17. A method for measuring thickness of an object comprising:
- placing an object on a movable platform in a thickness measuring apparatus;
- compressing a plunger on to the object placed on the movable platform;
- toggling a switching device using a toggle key upon sensing a predetermined compression by a compression sensor;
- measuring a distance of movement of the plunger using the measurement device upon toggling the switching device;
- obtaining a thickness measurement of the object by using the distance measured upon toggling the switching device; and
- automatically transmitting the thickness measurement to a remote database via a wireless medium.

18. The method of claim 17, wherein automatically transmitting the thickness measurement to the remote database via the wireless medium comprises automatically transmitting the thickness measurement to the remote database via a Bluetooth network, a Wi-Fi network, or a WiMAX network.

* * * * *